United States Patent
Sandner et al.

(10) Patent No.: US 11,398,755 B2
(45) Date of Patent: Jul. 26, 2022

(54) AXIAL-FLOW MACHINE HAVING A DIMENSIONALLY STABLE ASSEMBLY

(71) Applicant: Miba Sinter Austria GmbH, Laakirchen (AT)

(72) Inventors: Christian Sandner, Gmunden (AT); Dietmar Andessner, Offenhausen (AT); Ralf Kobler, Linz (AT); Matthias Redl, St. Poelten (AT); Markus Naglstrasser, St. Valentin (AT)

(73) Assignee: Miba Sinter Austria GmbH, Laakirchen (AT)

( * ) Notice: Subject to any disclaimer, the term of this patent is extended or adjusted under 35 U.S.C. 154(b) by 937 days.

(21) Appl. No.: 16/178,854

(22) Filed: Nov. 2, 2018

(65) Prior Publication Data
US 2019/0140503 A1     May 9, 2019

(30) Foreign Application Priority Data
Nov. 3, 2017   (EP) ..................................... 17199947

(51) Int. Cl.
*H02K 1/2793*       (2022.01)
*H02K 1/2713*       (2022.01)
(Continued)

(52) U.S. Cl.
CPC ......... *H02K 1/2793* (2013.01); *H02K 1/2713* (2013.01); *H02K 16/04* (2013.01); *H02K 21/24* (2013.01)

(58) Field of Classification Search
CPC ...... H02K 1/2793; H02K 1/2713; H02K 1/27; H02K 1/22; H02K 16/04; H02K 21/24; H02K 21/12
See application file for complete search history.

(56) References Cited

U.S. PATENT DOCUMENTS 4,629,920 A * 12/1986 Hermann ............... H02K 21/24
                                                  310/156.29
4,864,175 A *  9/1989 Rossi .................... H02K 1/2793
                                                  310/156.29
(Continued)

FOREIGN PATENT DOCUMENTS

CN    110506380 A  * 11/2019 ............. H02K 21/12
CN    112713684 A  *  4/2021
(Continued)

OTHER PUBLICATIONS

European Search Report in EP17199947 dated Apr. 18, 2018.

*Primary Examiner* — Edgardo San Martin
(74) *Attorney, Agent, or Firm* — Collard & Roe, P.C.

(57) ABSTRACT

An axial-flow machine has a dimensionally stable assembly, a machine shaft, a rotor fastened on the machine shaft and provided with a rotor hub, permanent magnets disposed circularly around the machine shaft, an adhesive and a brace, which is disposed on the outer circumference of the rotor and encircles it in closed manner and which urges the permanent magnets with a radially inwardly directed tension force, and stators disposed on both sides of the rotor. The permanent magnets are seated on the rotor hub via first adhesive joints equipped with adhesive and adjoin one another via second adhesive joints equipped with adhesive, wherein the permanent magnets, the rotor hub, the brace and the adhesive form the dimensionally stable assembly, the radial and axial dimensional stability of which is determined substantially by the radial tension force of the brace on the permanent magnets.

11 Claims, 2 Drawing Sheets

(51) Int. Cl.
 *H02K 16/04* (2006.01)
 *H02K 21/24* (2006.01)

(56) References Cited

U.S. PATENT DOCUMENTS

| | | | | |
|---|---|---|---|---|
| 5,334,899 A * | 8/1994 | Skybyk | ............... | H02K 1/2793 |
| | | | | 310/114 |
| 6,011,337 A * | 1/2000 | Lin | .................... | H02K 1/2793 |
| | | | | 310/103 |
| 6,674,214 B1 | 1/2004 | Knoerzer et al. | | |
| 6,995,494 B2 * | 2/2006 | Haugan | ................. | H02K 21/24 |
| | | | | 310/156.32 |
| 7,714,479 B2 * | 5/2010 | Seneff | .................... | H02K 15/03 |
| | | | | 310/268 |
| 8,421,303 B2 * | 4/2013 | Cruellas Alvarez | ... | H02K 21/24 |
| | | | | 310/268 |
| 10,102,953 B2 * | 10/2018 | Powell | ................... | H01F 7/021 |
| 11,128,186 B2 * | 9/2021 | Ravaud | ................. | H02K 16/04 |
| 2009/0072639 A1 * | 3/2009 | Seneff | .................... | H02K 1/2793 |
| | | | | 310/43 |
| 2017/0054336 A1 * | 2/2017 | Takezaki | .............. | H02K 1/2793 |

FOREIGN PATENT DOCUMENTS

| | | |
|---|---|---|
| DE | 10 2010 009486 A1 | 9/2011 |
| EP | 1 203 436 B1 | 5/2003 |
| JP | 2008-278648 A | 11/2008 |
| SU | 930508 A1 * | 5/1982 |

* cited by examiner

AXIAL-FLOW MACHINE HAVING A DIMENSIONALLY STABLE ASSEMBLY

CROSS REFERENCE TO RELATED APPLICATIONS

Applicant claims priority under 35 U.S.C. § 119 of European Application No. 17199947.7 filed on Nov. 3, 2017, the disclosure of which is incorporated by reference.

BACKGROUND OF THE INVENTION

1. Field of the Invention

The invention relates to an axial-flow machine having a dimensionally stable assembly, having a machine shaft, having a rotor fastened on the machine shaft and provided with a rotor hub, permanent magnets disposed circularly around the machine shaft, an adhesive and a bracing means, which is disposed on the outer circumference of the rotor and encircles it in closed manner and which urges the permanent magnets with a radial tension force, and having stators disposed on both sides of the rotor.

2. Description of the Related Art

In order to construct a rotor of an axial-flow machine having low mass and inertia, it known from the prior art (EP1203436A1) to create a kind of spoked wheel of fiber-reinforced plastic, in which alternately magnetized permanent magnets are interlockingly embedded or disposed therewith in buried manner. The fiber-reinforced plastic, together with the permanent magnets, forms on the rotor a dimensionally stable assembly, which is securely joined via flange to a machine shaft of the axial-flow machine.

The dimensionally stable unit is encompassed in closed manner on the outer circumference by a bracing means formed as a bandage, which exerts a radial tension force on the dimensionally stable assembly in order to withstand at least the centrifugal forces. Disadvantageously, relatively broad dimensions are needed on the spoked wheel for the interlocking ability of the subassembly—which restricts the size fraction of the permanent magnets on the rotor and thus the motor power of the axial-flow machine. The use of rare-earth magnets—for example expensive neodymium-iron-boron permanent magnets—for compensation of a reduced motor power, is therefore unavoidable, which consequently increases, among other factors, the manufacturing costs of the axial-flow machine.

SUMMARY OF THE INVENTION

The invention has therefore set itself the task of modifying an axial-flow machine of the type depicted in the introduction constructively in such a way that, despite high motor power and stability, an inexpensive manufacture is possible.

The set task is accomplished by the features of the invention.

If the permanent magnets are seated on the rotor hub via first adhesive joints equipped with adhesive, and if the permanent magnets adjoin one another via second adhesive joints equipped with adhesive, an interlocking connection encompassing the permanent magnets may be dispensed with—wherewith a particularly compactly constructed rotor having high magnetic volume fraction is created.

Despite avoidance of an interlocking connection, however, a reduced mechanical load capability of the rotor does not have to be expected, since, according to the invention, the permanent magnets, the rotor hub, the bracing means and the adhesive form the dimensionally stable assembly, the radial and axial dimensional stability of which is determined substantially by the radial tension force of the bracing means on the permanent magnets. The substance-to-substance bond of the adhesive may therefore be mechanically relieved, which reduces the danger of a failure of adhesion or cohesion of the adhesive. In particular, the bracing means disposed on the outer circumference of the rotor relieves the adhesive bond, for example relative to a shear, which develops between the permanent magnets due to magnetic force for the rotating magnetic field of the stator. This bracing means may also open up a broader temperature window at the rotor, since the adhesive is prevented from flowing due to the radial and axial dimensional stability of the rotor. Despite simple constructive design, therefore, the rotor according to the invention is able to provide—stably—a particularly high motor power.

The constructional complexity of the rotor may be further reduced when a bandage or a shrink-fitted bracing ring forms the bracing means.

Preferably, a bandage is used to construct the rotor with particularly low mass and inertia.

The connection between rotor and machine shaft may be improved when the rotor hub has, in cross section, a polygonal outer profile having side edges, on which the permanent magnets are seated via the first adhesive joint filled with adhesive. In this connection, it is conceivable that several permanent magnets can be seated on a common side edge.

If one permanent magnet is seated on each side edge via one adhesive joint each filled with adhesive, high torques can be transmitted—and so the stability of the axial-flow machine can be further increased.

A relatively inexpensive rotor may be created when the permanent magnets consist of a ferrite material.

A relatively high motor power may be made possible when rare-earth magnets constitute the permanent magnets.

If the rotor has several covers of a soft-magnetic powder-composite material that are provided on broad sides of the permanent magnets, eddy-current losses on the rotor can be reduced—especially when rare-earth magnets form the permanent magnets.

If the adhesive is flexibly elastic, it is able to absorb different thermal expansions and in this way to prevent thermal stresses on the permanent magnets. In this way their risk of rupture is also reduced and the stability of the axial-flow machine can be further increased. In particular, a silicone adhesive may prove to be excellent as the flexibly elastic adhesive for this purpose.

A particularly dimensionally stable assembly may be created when the adhesive is an epoxy-resin adhesive. In this way it is additionally possible to create a stiffer assembly, the resonance frequency of which, shifted into non-critical regions of the rotor, may further increase the stability of the axial-flow machine. Preferably, the epoxy-resin adhesive comprises a two-component system on the basis of epoxy resin and hardener. Preferably, this epoxy-resin adhesive comprises a condensation polymer of bisphenol A and epichlorohydrin, in order to be able to assure a high modulus of elasticity at the substance-to-substance bond.

Preferably, the adhesive joints have a maximum gap size of 0.5 mm. In particular, a gap size of 0.3 mm to 0.5 mm may prove advantageous, in order to act in compensating manner on dimensional inaccuracies of the permanent magnets while nevertheless guaranteeing a stable adhesive bond.

The construction of the axial-flow machine may be further simplified when the permanent magnets and the second adhesive joints filled with adhesive form, on the rotor, a cylindrical circumferential face on which the bracing means is disposed. In addition, this may facilitate a provision of the bracing means.

If the cylindrical circumferential face of the rotor is cylindrically machined by material removal, especially ground, this may safely prevent rupture of the bracing means, for example due to pressing by a magnet edge. The stability of the axial-flow machine may be further increased thereby, especially when the bracing means is constructed as a bandage.

BRIEF DESCRIPTION OF THE DRAWINGS

By way of example, the subject matter of the invention is illustrated in more detail in the figures, on the basis of an embodiment variant, wherein.

DETAILED DESCRIPTION OF THE PREFERRED EMBODIMENTS

Figure 1:
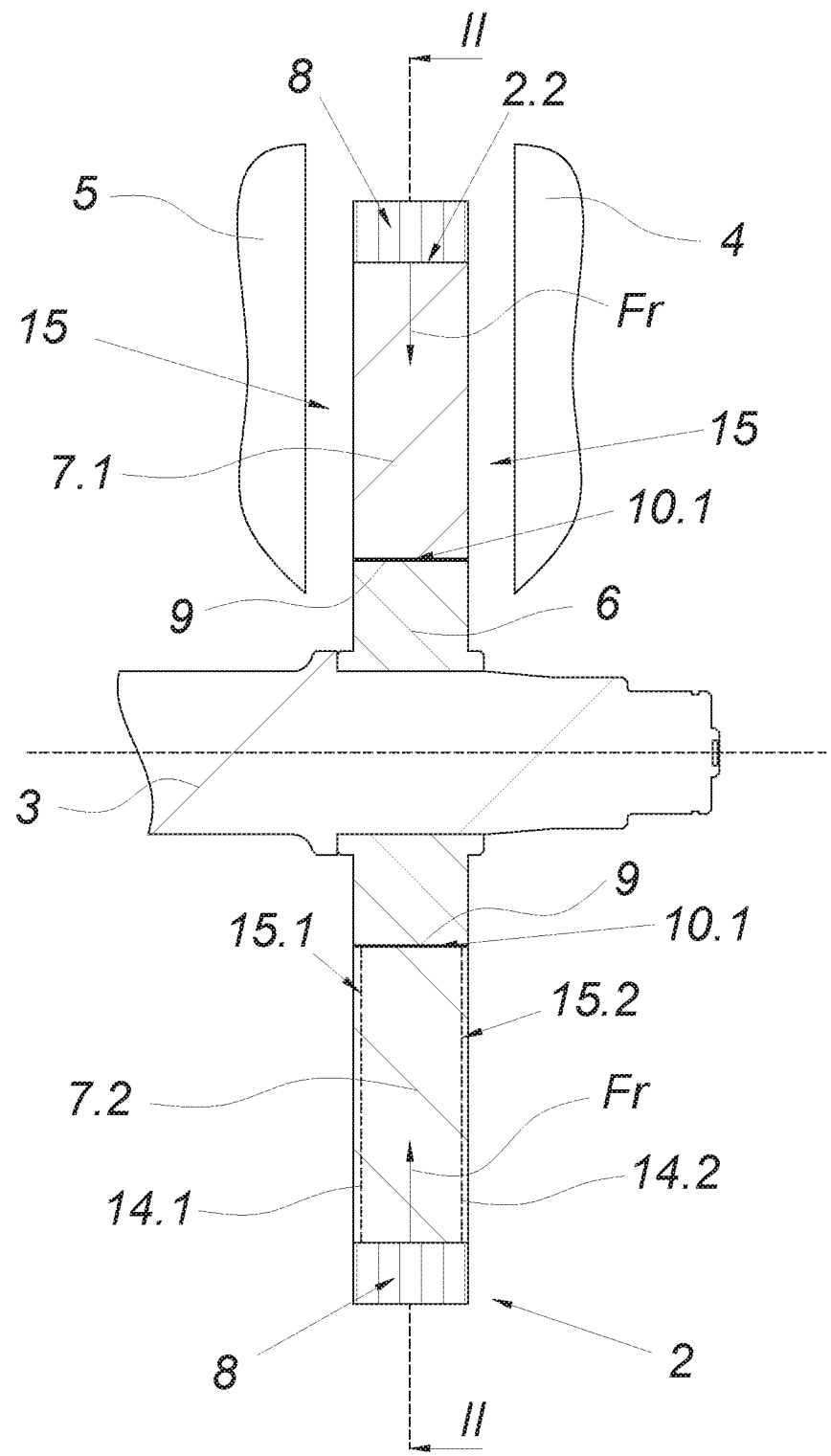
FIG. 1 shows a cutaway side view of a partly illustrated axial-flow machine and FIG. 2 shows a sectional view along II-II of FIG. 1.

The axial-flow machine 1 illustrated by way of example according to FIG. 1 has a rotor 2, a machine shaft 3 and two stators 4, 5 disposed on both sides of the rotor 2. The rotor 2 is fastened on the machine shaft 3—and specifically via its rotor hub 6 held frictionally on the machine shaft 3. In addition, permanent magnets 7.1, 7.2, which are disposed circularly around the machine shaft 3, are associated with the rotor 2.

Figure 2:
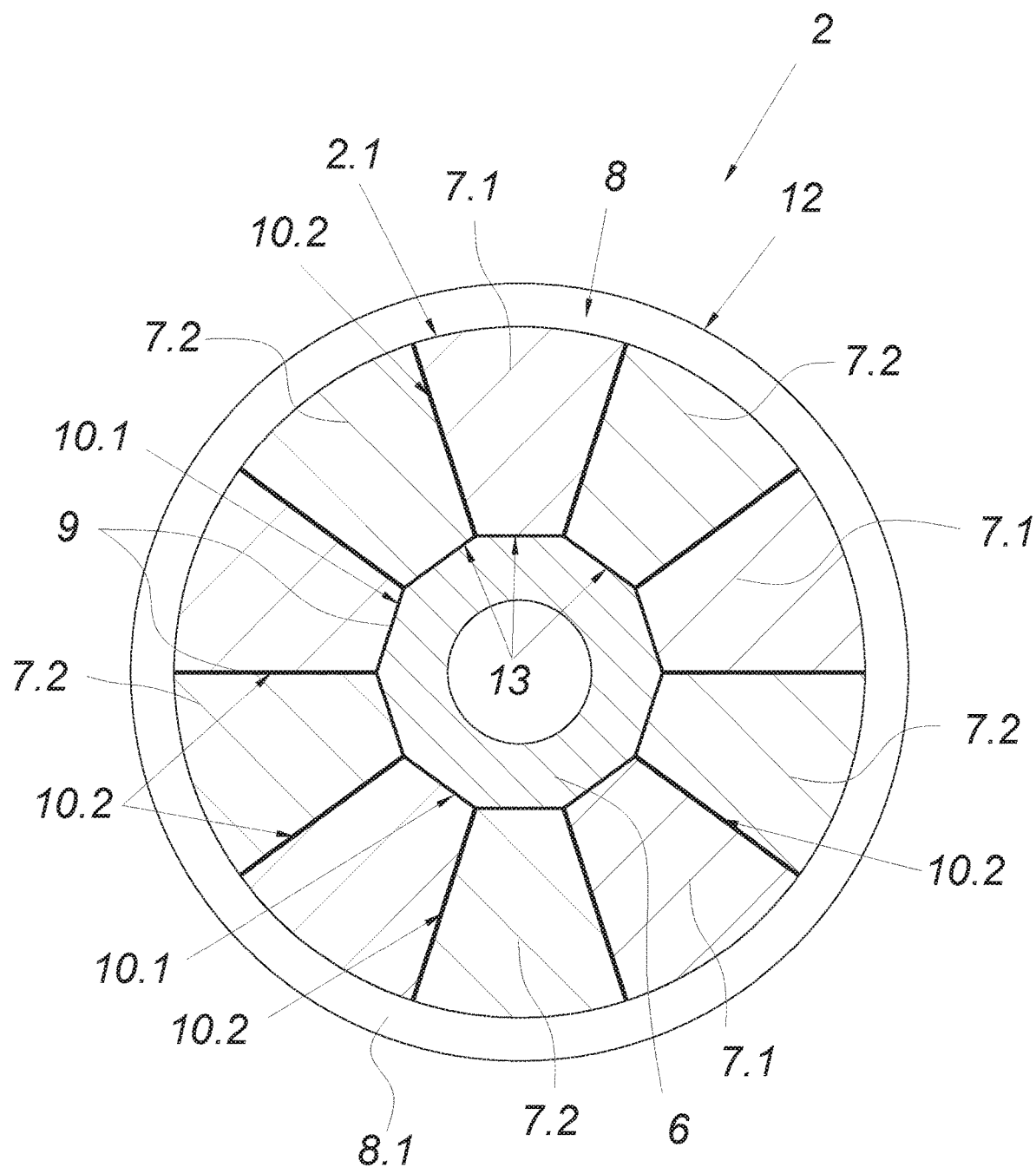

The permanent magnets 7.1, 7.2 are alternately magnetized—to the effect, for example, that two adjacent permanent magnets have opposite directions of magnetization, as illustrated by a different shading pattern according to FIG. 2. The magnetization directions of the permanent magnets 7.1, 7.2 run parallel to the longitudinal axis of the machine shaft 3.

In addition, the rotor 2 has a bracing means 8 disposed on the outer circumference 2.1 of the rotor 2 and encircling it in closed manner. This bracing means 8, designed as a bandage 8.1, consists of a preimpregnated fiber material, preferably glass fibers, etc., which were wound in circumferential direction. It is also conceivable that the fiber material is impregnated after the winding. The bracing means 8 urges the permanent magnets 7.1, 7.2 with a radially inwardly directed tension force Fr and acts against the centrifugal force. As an example, the bracing means 8 may be formed as a bracing ring that can be shrink-fitted, which has not been illustrated.

According to the invention, the permanent magnets 7.1, 7.2 are seated on the rotor hub 6 via first adhesive joints 10.1 and adjoin one another via second adhesive joints 10.2—for this purpose, the adhesive 9 is provided in the first and second adhesive joints 10.1, 10.2. The rotor 2 therefore consists substantially of the permanent magnets 7.1, 7.2 in a circular region of the circumference. This makes a maximized magnet volume available in order to achieve a particularly high motor power.

However, the mechanical stability of the rotor 2 is not impaired in this way, because the permanent magnets 7.1, 7.2, the rotor hub 6, the bracing means 8 and the adhesive 9 form a dimensionally stable assembly 12.

This is assured by the fact that the radial and axial dimensional stability of the assembly 12 is determined substantially by the radial tension force Fr of the bracing means 8 on the permanent magnets 7.1, 7.2. Since the bracing means clamps the permanent magnets 7.1, 7.2 together with the rotor hub 6, the strength of the frictional connection of the adhesive 9 also loses importance, and so it is substantially more able to fulfill a function that spaces the permanent magnets 7.1, 7.2 apart—for example to protect them from warping and therefore from rupture.

The pressure pre-tensioning of the bracing means 8 can be absorbed without problems by the permanent magnets 7.1, 7.2. The tension fore Fr is greater than the centrifugal force on the permanent magnets 7.1, 7.2. Thus it is ensured that the permissible tensile stress of the permanent magnets 7.1, 7.2 is not exceeded or does not lift them up.

The axial-flow machine 1 constructed according to the invention is therefore characterized not only by a particularly high motor power but also by high stability.

This is also the case in particular because the adhesive 9 is also high-strength—especially because it is composed as an epoxy-resin adhesive. In addition, such an adhesive bond is advantageously able to shift the resonance frequency of the rotor into non-critical regions, which may further increase the stability of the axial-flow machine. In this connection, an epoxy-resin adhesive 9 may be particularly useful, for example a condensation polymer of bisphenol A and epichlorohydrin, with addition of a hardener, for example of the EPH 161 type.

The first and second adhesive joints 10.1, 10.2 have a gap size of 0.3 mm to 0.5 mm, whereby a stable bracing of the permanent magnets 7.1, 7.2 on the rotor hub 6 is assured.

Due to this compact design of the rotor 2, the possibility also exists of constructing the permanent magnets from a ferrite material. This greatly reduces the costs of the rotor 2—thus making an inexpensively constructed axial-flow machine 1 possible.

In cross section, the rotor hub 6 has a polygonal outer profile having side edges 13—as can be seen in FIG. 2. A permanent magnet 7.1, 7.2, each having a first adhesive joint 10.1, is seated on each side edge 13, wherein first adhesive joints 10.1 are filled with adhesive 9. Thus a high twisting resistance of the permanent magnets 7.1, 7.2 relative to the rotor hub 6 is achieved.

In addition, the rotor 2 has several soft-magnetic covers 14.1, 14.2, which are provided on broad sides 15.1, 15.2 of the permanent magnets 7.1, 7.2, and which consist of a soft-magnetic powder-composite material. These soft-magnetic covers 14.1, 14.2 indeed enlarge the air gap 15 between the permanent magnets 7.1, 7.2 and the respective stators 4, 5, but nevertheless eddy-current effects may be advantageously excluded thereby—above all when the permanent magnets 7.1, 7.2 are constructed as rare-earth magnets.

As can be seen in FIG. 2, the permanent magnets 7.1, 7.2 and the second adhesive joints 10.2 filled with adhesive 9 form, on the rotor 2, a cylindrical circumferential face 2.2, on which the bracing means 8 is disposed. Constructively simply solved, the permanent magnets 7.1, 7.2 have substantially an isosceles trapezoid shape, wherein the longer base side has a circular arc shape.

In addition, the cylindrical circumferential face 2.2 of the rotor 2 is cylindrically machined by material removal, in particular is ground, namely fine-ground, in order to be able to exclude the singular mechanical stresses on the bracing means 8. In this way, high stability can be achieved with the axial-flow machine 1 according to the invention even at high speeds of revolution.

The invention claimed is:

1. An axial-flow machine having a dimensionally stable assembly (12), having a machine shaft (3), having a rotor (2) fastened on the machine shaft (3) and provided with a rotor hub (6), permanent magnets (7.1, 7.2) disposed circularly around the machine shaft (3), an adhesive (9) and a bracing means (8), which is disposed on the outer circumference (2.1) of the rotor (2) and encircles it in closed manner and which urges the permanent magnets (7.1, 7.2) with a radially inwardly directed tension force (Fr), and having stators (4, 5) disposed on both sides of the rotor (2), wherein the permanent magnets (7.1, 7.2) are seated on the rotor hub (6) via first adhesive joints (10.1) equipped with adhesive (9) and adjoin one another via second adhesive joints (10.2) equipped with adhesive (9), wherein the permanent magnets (7.1, 7.2), the rotor hub (6), the bracing means and the adhesive (9) form the dimensionally stable assembly (12), the radial and axial dimensional stability of which is determined substantially by the radial tension force (Fr) of the bracing means (8) on the permanent magnets (7.1, 7.2).

2. The axial-flow machine according to claim 1, wherein a bandage (8.1) or a shrink-fitted bracing ring forms the bracing means (8).

3. The axial-flow machine according to claim 1, wherein the rotor hub (6) has, in cross section, a polygonal outer profile having side edges (13), on which the permanent magnets (7.1, 7.2) are seated via the first adhesive joint (10.1) filled with adhesive (9).

4. The axial-flow machine according to claim 3, wherein a permanent magnet (7.1, 7.2) is seated on each side edge via a first adhesive joint (10.1) each filled with adhesive (9).

5. The axial-flow machine according to claim 1, wherein the permanent magnets (7.1, 7.2) comprise a ferrite material.

6. The axial-flow machine according to claim 1, wherein rare earth magnets form the permanent magnets (7.1, 7.2).

7. The axial-flow machine according to claim 1, wherein the rotor (2) has several covers (15.1, 15.2) of a soft-magnetic powder-composite material, which are provided on broad sides (14.1, 14.2) of the permanent magnets (7.1, 7.2).

8. The axial-flow machine according to claim 1, wherein the adhesive (9) is an epoxy-resin adhesive, especially a condensation polymer of bisphenol A and epichlorohydrin.

9. The axial-flow machine according to claim 1, wherein the adhesive joint has a maximum gap size 0.5 mm.

10. The axial-flow machine according to claim 1, wherein the permanent magnets (7.1, 7.2) and the second adhesive joints (10.2) filled with adhesive (9) form, on the rotor (2), a cylindrical circumferential face (2.2), on which the bracing means (8) is disposed.

11. The axial-flow machine according to claim 10, wherein the cylindrical circumferential face (2.2) of the rotor (2) is cylindrically machined by material removal.

\* \* \* \* \*